(12) United States Patent
Nagai et al.

(10) Patent No.: US 7,448,134 B2
(45) Date of Patent: Nov. 11, 2008

(54) METHOD FOR PRODUCING ACTUATOR HAVING GUIDE-EQUIPPED FRAME

(75) Inventors: Shigekazu Nagai, Tokyo (JP); Akio Saitoh, Koshigaya (JP); Masaru Saitoh, Joso (JP)

(73) Assignee: SMC Kabushiki Kaisha, Tokyo (JP)

( * ) Notice: Subject to any disclaimer, the term of this patent is extended or adjusted under 35 U.S.C. 154(b) by 39 days.

(21) Appl. No.: 11/564,395

(22) Filed: Nov. 29, 2006

(65) Prior Publication Data

US 2007/0107228 A1 May 17, 2007

Related U.S. Application Data

(60) Continuation-in-part of application No. 10/852,756, filed on May 25, 2004, now abandoned, which is a division of application No. 10/108,901, filed on Mar. 29, 2002, now abandoned.

(30) Foreign Application Priority Data

Apr. 6, 2001 (JP) .............................. 2001-108192

(51) Int. Cl.
*B21D 53/10* (2006.01)
(52) U.S. Cl. ................... 29/898.03; 29/898.07; 29/557; 74/89.33; 384/42; 148/607
(58) Field of Classification Search ............. 29/898.03, 29/898.07, 557; 384/42, 50, 55; 74/89.33; 148/326, 328, 607, 609
See application file for complete search history.

(56) References Cited

U.S. PATENT DOCUMENTS

| 3,900,233 | A | 8/1975 | Thomson |
| 4,582,371 | A | 4/1986 | Mottate |
| 5,431,498 | A | 7/1995 | Lyon |
| 5,454,278 | A | 10/1995 | Kasuga |
| 5,637,940 | A | 6/1997 | Nagai et al. |
| 5,747,896 | A | 5/1998 | Nagai et al. |
| 5,749,266 | A | 5/1998 | Tsukada |
| 5,755,515 | A | 5/1998 | Senjo et al. |
| 6,000,292 | A | 12/1999 | Nagai et al. |
| 6,019,513 | A | 2/2000 | Tsukada et al. |

(Continued)

FOREIGN PATENT DOCUMENTS

JP 2-12554 1/1990

(Continued)

*Primary Examiner*—Jermie E Cozart
(74) *Attorney, Agent, or Firm*—Paul A. Guss

(57) ABSTRACT

Pressed shape steel, made of a low cost general steel material that is not hardened, forms a frame with long grooves cut therein. Guide rails, made of a specialized steel material that can be subjected to a hardening treatment, are hardened. Thereafter, outer surfaces of the hardened guide rails are ground and the guide rails are integrally joined in the long grooves. Ball-rolling grooves are formed in the guide rails, thereby completing a guide-equipped frame for an actuator. Because the general steel material and the specialized steel material are principally ferrous materials, both exhibiting a Young's modulus at or above 170 GPa with substantially the same coefficient of linear thermal expansion, the frame needn't be increased in size or have a complex internal structure to reinforce the strength of the frame, and the guide rails remain securely retained in the grooves even if the actuator experiences changes in temperature.

8 Claims, 10 Drawing Sheets

U.S. PATENT DOCUMENTS

| | | |
|---|---|---|
| 6,070,479 A | 6/2000 | Shirai |
| 6,240,796 B1 | 6/2001 | Yamada |
| 6,344,718 B1 | 2/2002 | Nagai et al. |
| 6,346,788 B1 | 2/2002 | Nagai et al. |
| 2002/0164095 A1 | 11/2002 | Nagai et al. |
| 2003/0224890 A1 | 12/2003 | Nagai et al. |

FOREIGN PATENT DOCUMENTS

| | | |
|---|---|---|
| JP | 11-30234 | 2/1999 |

METHOD FOR PRODUCING ACTUATOR HAVING GUIDE-EQUIPPED FRAME

This application is a continuation in part of U.S. patent application Ser. No. 10/852,756, filed on May 25, 2004, now abandoned, which is a divisional of U.S. patent application Ser. No. 10/108,901, filed on Mar. 29, 2002, now abandoned.

BACKGROUND OF THE INVENTION

1. Field of the Invention

The present invention relates to an actuator comprising a guide-equipped frame having guide grooves formed on the frame. The present invention also relates to a method for producing such a guide-equipped frame.

2. Description of the Related Art

Various actuators are conventionally used to transport or position a workpiece. Japanese Laid-Open Utility Model Publication No. 2-12554, for example, discloses an actuator having a guide-integrated frame which has guide grooves integrally formed on inner wall surfaces.

The actuator comprises the guide-integrated frame having ball-rolling grooves (guide grooves) axially extending on the inner wall surfaces on both opposed sides. The guide-integrated frame has a ball screw shaft which extends substantially in parallel to the ball-rolling grooves. Further, the guide-integrated frame has a slider. The slider reciprocates along the ball-rolling grooves under a screwing action by means of the ball screw shaft.

A method for producing the conventional guide-intergrated frame will be briefly explained. A pillar-shaped member is drawn to form a drawn product. Warpage of the drawn product is straightened. Next, cutting machining is performed on outer surfaces of the drawn product that cannot be straightened. Then straightening is performed again.

Next, a hardening process, such as vacuum hardening or high frequency hardening, is performed. Thereafter, straightening and polishing are performed on the outer surface. Groove-polishing is also performed to form ball-rolling grooves along the inner wall surfaces, using a disk-shaped grinding wheel or the like. Thus, the guide-integrated frame is completed.

However, a large number of treatment steps are required in the method for producing the conventional guide-integrated frame. Therefore, production costs are high. Further, it is impossible to improve production efficiency, because an extremely long period of time is required to polish the outer surface.

U.S. Pat. No. 5,755,515 discloses an actuator body having a base portion fabricated from a light metal or a light metal alloy and supporting a slider, made of the same light metal or light metal alloy as the base, for reciprocal movement along the base portion. The slider and base portions of the actuator include respective guide rails. More specifically, the base portion includes a pair of base rails, made of hardened steel, and the slider includes a pair of slider rails, also made of hardened steel, which are fitted into side grooves provided in the base portion and the slider respectively.

In the above structure, the base rails are made according to the following process. First, the base rails are formed by grinding or by a plasticity rolling process, and rolling body tracks are formed in the rails by a heat treatment and hardening process. Under this condition, the base rails are fitted into the base side grooves, and the rolling body tracks are ground to have a transverse cross-sectional shape of a Gothic style arch. The slider rails, which are formed by the same process, are fitted into the slider side grooves. To reduce adverse effects caused by a difference in the coefficients of linear thermal expansion of aluminum and steel, critical dimensional features of the actuator are established, such that the thickness D2 of the base rails (as well as the thickness of the slider rails) is set to be smaller than the diameter D3 of the balls, and equal to or less than 10% of a center distance L2 between the balls on respective sides of the slider, and further, the width B of the base rails is set to be equal to or less than twice the diameter D3 of the balls, thereby satisfying the relationships, $D2<D3$, $D2 \leqq 0.1 \times L2$, and $B \leqq 2 \times D3$.

Noted advantages associated with the above structure are, (1) since most of the base and slider are made of aluminum and only the base rails and slider rails are made of steel, the overall structure is light in weight, (2) thermal expansion related problems are reduced because the portions associated with rolling of the balls are made of the same material on both the base and slider sides, (3) the mechanical strength of the steel base rail and the steel slider rail are high so as to ensure stable performance over time, and (4) owing to the critical dimensional features discussed above, it is possible to reduce the influence of dimensional changes caused by the difference in thermal expansion between aluminum and steel.

Nevertheless, in the actuator of U.S. Pat. No. 5,775,515, although attempts are made to minimize the adverse effects brought about by the difference in thermal expansion between aluminum and steel, a complete solution to this problem cannot be obtained. In particular, since the coefficients of linear thermal expansion differ markedly ($23.6 \times 10^{-6}/°$ C. for aluminum alloys verses $10.7 \times 10^{-6}/°$ C. for steel), when moved into a hotter environment, the aluminum alloy portions of the base and slider, including the side grooves thereof in which the guide rails are positioned, expand roughly two times greater than the steel guide rails themselves, which leads to gaps occurring between the side grooves and the guide rails, along with potential dislodgement or loosening of the guide rails within the side grooves.

Moreover, a further problem results from the disclosed structure owing to the difference in Young's modulus, which is a measure of rigidity, between aluminum and steel. In particular, because the Young's modulus of a light aluminum alloy is only about one-third that of steel and other ferrous based metals, the cross-sectional shape and size of the base frame in U.S. Pat. No. 5,755,515 must be made much larger, and a complex hollowed structure must be used, in order to provide sufficient rigidity comparable to that of a steel frame, increasing both size and cost, as well as complexity in fabricating the actuator body.

SUMMARY OF THE INVENTION

A general object of the present invention is to provide an actuator and method for producing an actuator having a guide-equipped frame, which reduces production costs by simplifying the production steps to conveniently produce the actuator.

A principal object of the present invention is to provide an actuator and method for producing an actuator having a guide-equipped frame, which improves production efficiency by simplifying the production steps to conveniently produce the actuator.

Another major object of the present invention is to provide an actuator employing a method in which both the frame and guide rails are made from similar ferrous (i.e., iron based) materials, yet wherein only the guide rails are subjected to a hardening treatment, thus allowing the frame to be made of a low cost general steel material, whereas the guide rails are formed of a specialized steel material that can be subjected to hardening. As a result, since the principal elemental base material is iron (Fe) for both the frame and the guide rails, the Young's modulus is substantially the same for both, and although the frame is not subjected to hardening, the frame and guide rails can still exhibit a uniform solid shape and rigidity. A complex hollowed or internal ribbed structure for the frame is not required.

Yet another major object of the present invention is to provide an actuator employing a method in which the general steel material used for the frame and the specialized hardened steel material used for the guide rails exhibit substantially the same coefficient of linear thermal expansion. Therefore, even when used in different temperature environments, gaps or clearances do not develop between the frame and the guide rails due to thermal expansion, and the guide rails always remain firmly secured within accommodating long grooves provided in the frame.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
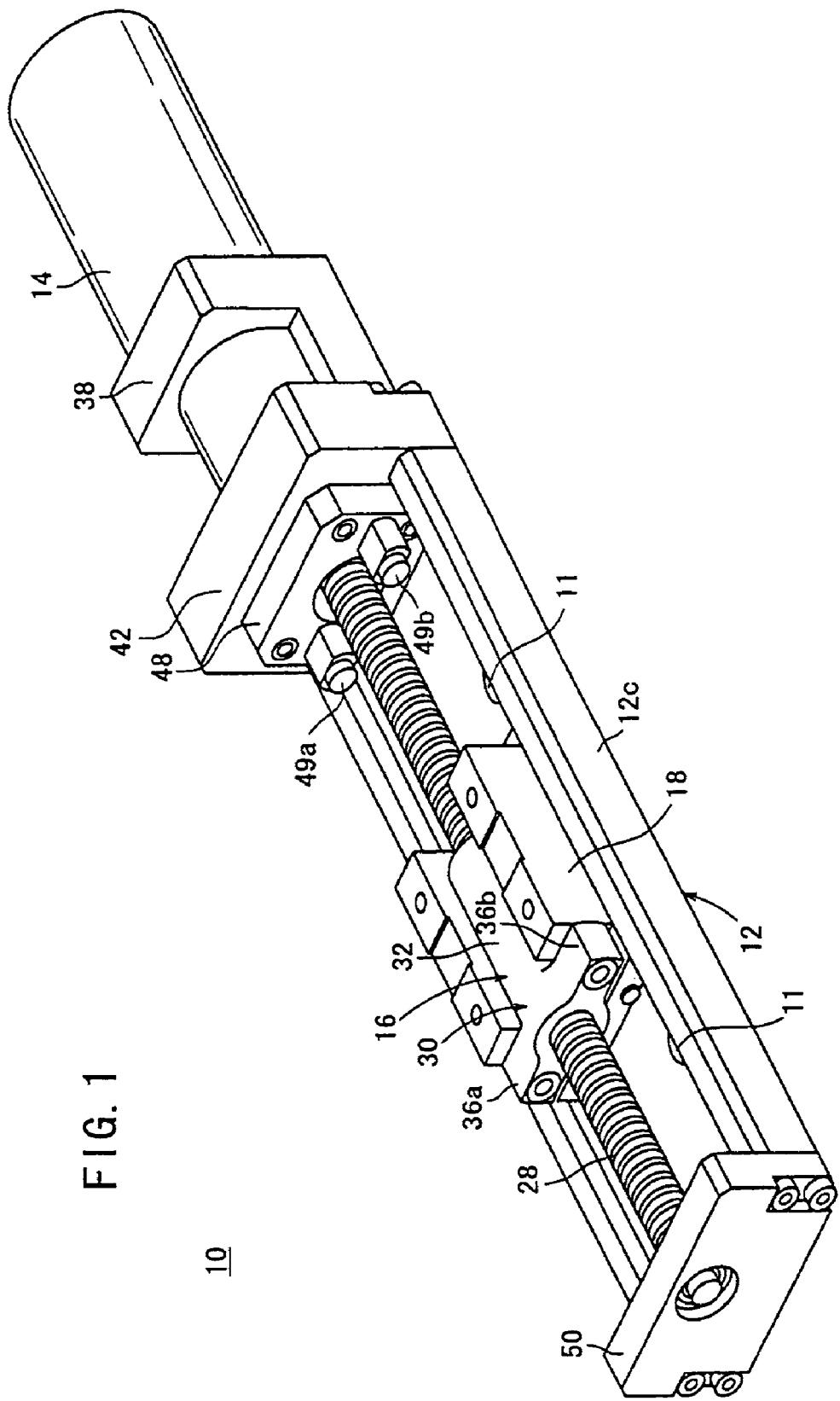
FIG. 1 is a perspective view illustrating an actuator according to an embodiment of the present invention.

In FIG. 1, reference numeral 10 indicates an actuator according to an embodiment of the present invention.

Figure 3:
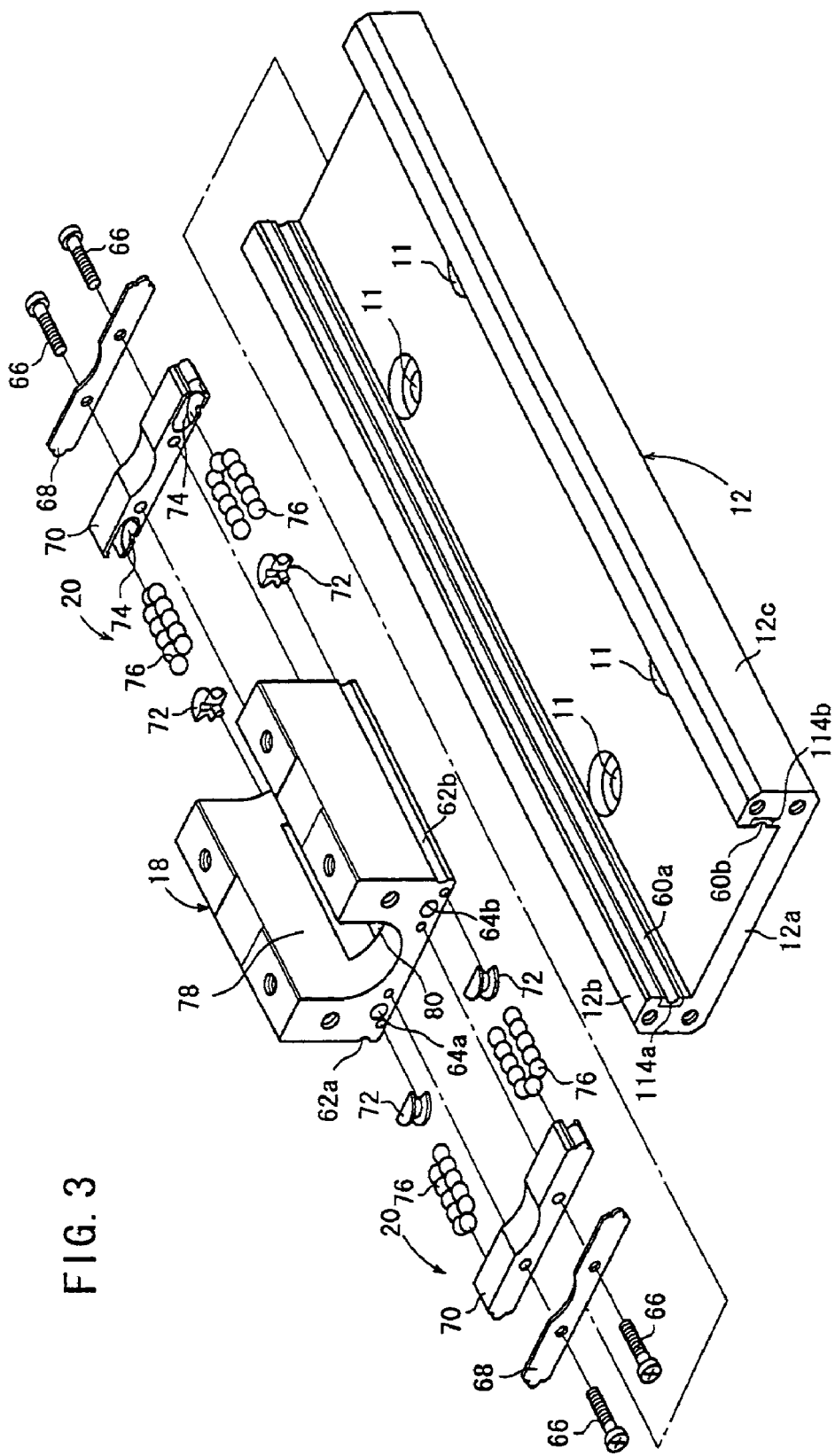
FIG. 3 is a partial exploded perspective view illustrating the actuator shown in FIG. 1.

The actuator 10 comprises a guide-equipped frame 12, a rotary driving source 14, a feed screw shaft mechanism 16, a slider 18 and a guide mechanism 20 (see FIG. 3).

The guide-equipped frame 12 has a recess including a plurality of attachment holes 11. The rotary driving source 14 is connected to one end of the guide-equipped frame 12. The feed screw shaft mechanism 16 is a unit detachable with respect to the guide-equipped frame 12. The feed screw shaft mechanism 16 transmits the rotary driving force of the rotary driving source 14 by the aid of an unillustrated coupling member. The slider 18 is reciprocated in the axial direction of the guide-equipped frame 12 by the driving force transmitted by the feed screw shaft mechanism 16. The guide mechanism 20 (see FIG. 3) guides the slider 18 along the guide-equipped frame 12.

Figure 2:
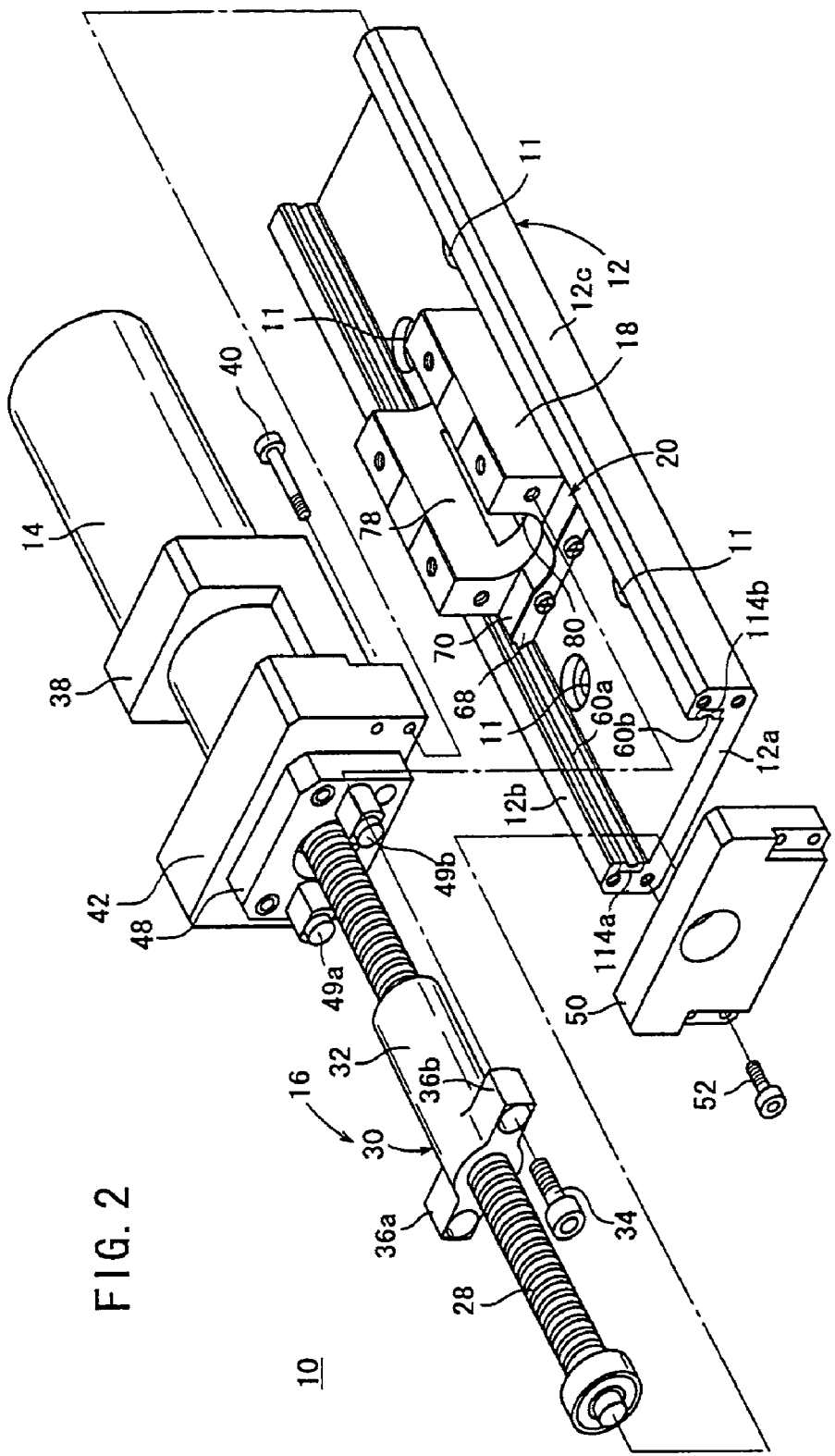
FIG. 2 is an exploded perspective view illustrating the actuator shown in FIG. 1.

As shown in FIGS. 2 and 3, the guide-equipped frame 12 comprises a bottom 12a of a flat plate shape and a pair of sides 12b, 12c. The pair of sides 12b, 12c are substantially perpendicular to the bottom 12a. The pair of sides 12b, 12c are integrally formed so that they may face one another.

As shown in FIG. 2, the feed screw shaft mechanism 16 includes a ball screw shaft (feed screw shaft) 28 coaxially coupled to the drive shaft of the rotary driving source 14 by the unillustrated coupling member, and a ball screw nut (feed screw nut) 30 having a penetrating screw hole for the ball screw shaft 28 to be screwed therein.

The ball screw nut 30 includes a cylindrical section 32 and a pair of flanges 36a, 36b. The cylindrical section 32 includes the penetrating screw hole. The pair of flanges 36a, 36b are integral with one end of the cylindrical section 32 and are fixed to side surfaces of the slider 18 by screws 34.

The feed screw shaft mechanism 16 includes a housing 42, an unillustrated bearing mechanism and a bearing-holding member 48.

The housing 42 has a support section 38 for supporting the rotary driving source 14 and is connected to one end of the guide-equipped frame 12 by screws 40. The unillustrated bearing mechanism is connected to one end of the ball screw shaft 28. The bearing-holding member 48 is connected to the housing 42 by screws. A pair of dampers 49a, 49b are disposed on the bearing-holding member 48. The pair of dampers 49a, 49b are substantially horizontally spaced from each other by a predetermined distance and protrude toward the slider 18 on the bearing-holding member 48.

An end plate 50 is installed by screws 52 to the other axial end of the guide-equipped frame 12. The end plate 50 rotatably supports one end of the ball screw shaft 28.

As shown in FIG. 3, the guide mechanism 20 includes a pair of opposed first ball-rolling grooves 60a, 60b, a pair of second ball-rolling grooves 62a, 62b, and a pair of ball-rolling holes 64a, 64b.

The pair of opposed first ball-rolling grooves 60a, 60b extend in the axial direction of the guide-equipped frame 12 on the inner walls of both sides 12b, 12c of the guide-equipped frame 12. Each of the pair of opposed first ball-rolling grooves 60a, 60b has a vertical cross section having a circular arc shape. The pair of second ball-rolling grooves 62a, 62b are formed on side surfaces of the slider 18 facing the inner walls of the guide-equipped frame 12. Each of the pair of second ball-rolling grooves 62a, 62b has a vertical cross section having a circular arc shape. The pair of ball-rolling holes 64a, 64b are disposed near the second ball-rolling grooves 62a, 62b and penetrate axially through the slider 18.

Figure 4A:
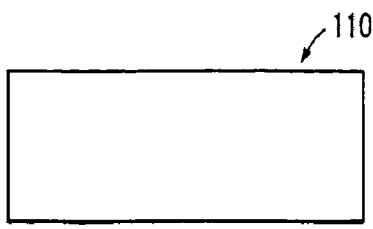
FIGS. 4A to 4G illustrate steps for producing a guide-equipped frame respectively.
Figure 4B:
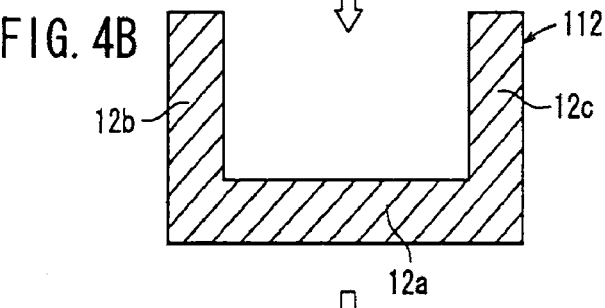
Figure 4D:
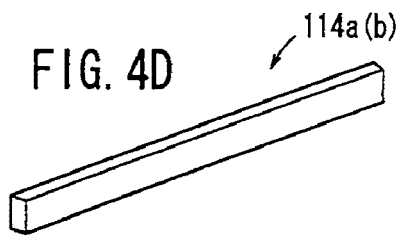
Figure 4C:
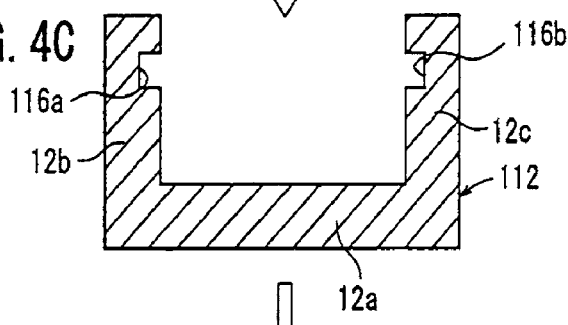
Figure 4E:
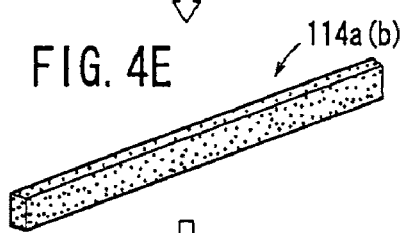

Long grooves 116a, 116b (see FIG. 4C) are formed on the inner walls of both sides 12b, 12c of the guide-equipped frame 12. The long grooves 116a, 116b extend axially. A pair of guide rails 114a, 114b having the first ball-rolling grooves 60a, 60b are secured to the long grooves 116a, 116b (see FIG. 4G).

The guide mechanism 20 includes plates 68 and covers 70, and return guides 72. The plates 68 and the covers 70 are integrally connected to lower portions of the slider 18 by screws 66. The plates 68 and the covers 70 are substantially parallel to the flanges 36a, 36b of the ball screw nut 30. The return guides 72 are installed respectively on side surfaces of the slider 18. The plate 68, the cover 70, and the return guides 72 are preferably formed of a resin material.

The plate 68 and the cover 70 are installed on the lower side surface of the slider 18. In other words, the plate 68 and the cover 70 are not installed on the upper side surface of the slider 18. Therefore, the upper side surface thereof can be used as an abutment surface for enabling each of the dampers 49a, 49b to abut against each other.

Components of the plate 68, the cover 70 and the return guides 72 are the same on one and the other axial side surfaces of the slider 18.

Ball return grooves 74 are formed on the cover 70. Endless circulating tracks are constituted by mutually opposed first and second ball-rolling grooves 60a, 60b, 62a, 62b, the penetrating ball-rolling holes 64a, 64b formed through the slider 18, and the ball return grooves 74. The endless circulating tracks enable a plurality of balls 76 to roll therein.

As shown in FIGS. 2 and 3, an opening 78 having a U-shaped cross section is formed at an upper center portion of the slider 18. The opening 78 extends axially. The opening 78 is of a large recessed shape, which is open upwardly. The cylindrical section 32 of the ball screw nut 30 is installed detachably upwardly.

As shown in FIGS. 2 and 3, a hole 80 is formed through the slider 18. The hole 80 penetrates from the opening 78 downwardly through the slider 18. The hole 80 has a rectangular cross section. Return tubes (not shown) are accommodated in the hole 80. The return tubes are installed in the ball screw nut 30 and serve as passages for enabling the plurality of balls 76 to roll therein. Therefore, the hole 80, which accommodates the return tubes therein, reduces the height of the slider 18.

The actuator 10 according to the embodiment of the present invention is basically constructed as described above. Operations, functions, and effects of the actuator 10 shall be explained below.

First, the steps for producing the guide-equipped frame 12 of the actuator 10 shall be explained.

A flat plate-shaped formable steel member 110, which is composed of a general low cost steel material, for example, any of materials such as SS400 and S45C in accordance with the Japanese Industrial Standard (JIS), is pressed to form the frame 112 (see FIGS. 4A and 4B) comprising the bottom 12a and both sides 12b, 12c which are integrally formed. The pressed frame 112 is straightened. Thereafter, cutting machining is roughly performed. Cutting machining is further performed to form the long grooves 116a, 116b which are substantially in parallel to the axis of the frame 112 (see FIG. 4C). The guide rails 114a, 114b are inserted into the long grooves 116a, 116b, as described later on.

The prism-shaped guide rails 114a, 114b are hardened by a step, which is different from the step performed for the formable steel member 110. Each of the prism-shaped guide rails 114a, 114b is formed of a specialized steel material that is capable of being hardened. Specialized steels that can be subjected to a hardening treatment are exemplified, for example, by materials such as SKH9, SCM420 and SUJ2, in accordance with the Japanese Industrial Standard (JIS). Next, the outer surfaces of the guide rails 114a, 114b are ground (see FIGS. 4D and 4E).

Figure 4F:
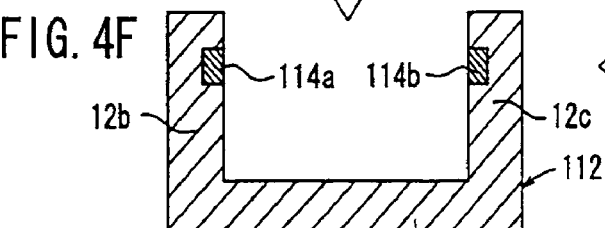
Figure 4G:
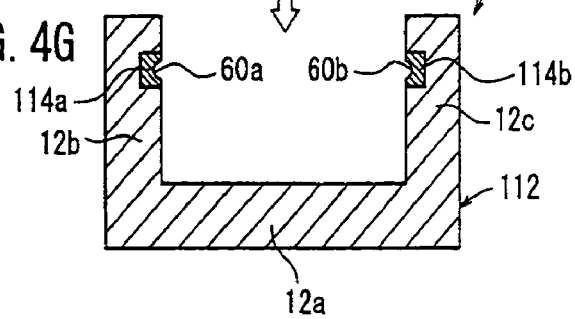

The guide rails 114a, 114b are inserted into and coupled integrally to the long grooves 116a, 116b of the frame 112 (see FIG. 4F). The guide rails 114a, 114b are polished to form the ball-rolling grooves (guide grooves) 60a, 60b. Thus, the guide-equipped frame 12 is completed (see FIG. 4G).

Adhesion, forcible insertion fitting, welding fusion, and so on, may be used to connect the guide rails 114a, 114b into the long grooves 116a, 116b of the frame 112.

In the method for producing the guide-equipped frame 12, the main frame body is not hardened. Only the guide rails 114a, 114b, having the ball-rolling grooves 60a, 60b, and which are formed of the specialized steel material, are subjected to hardening. The frame 112 tends to be thermally deformed by hardening. However, since the frame body is not subjected to hardening, it is not necessary to straighten the frame 112 and to polish the outer surface of the frame 112. Therefore, the production steps can be simplified, thereby reducing production costs.

According to the conventional method, the main frame body is hardened by means of a heat treatment, which results in thermal deformation. Therefore, it is necessary to perform straightening and polishing of the outer surface of the frame after hardening has been performed. By contrast, according to the production method of the present invention, only cutting machining is performed on the pressed main frame body. Therefore, it is possible to greatly reduce costs and to improve production efficiency.

Further, according to the conventional method, an extremely long period of time is typically required to polish the outer surface of the main frame body. According to the present invention, however, cutting machining may be performed by using a milling cutter or the like. Therefore, the time required for machining can be greatly reduced.

The surface and/or the interior of the main frame body has conventionally been subjected to a hardening treatment by heating. However, in this case, if the outer surface of the main frame body is further machined to form the attachment hole and the attachment groove, it is necessary to use a cemented carbide bit or the like, so as to be capable of cutting the hardened material. This increases production costs, since a cemented carbide bit or the like must be purchased. By contrast, in the production method of the present invention, the frame 112 is not subjected to hardening by heating. Therefore, any additional machining can conveniently be performed, for an unillustrated attachment hole or the like, using ordinary cutting machining methods.

A specialized metal material, which can be hardened, has conventionally been used for the frame. Therefore, purchase costs for the specialized metal material are expensive. By contrast, in the present invention, the frame 112 does not require an expensive metal material, which can be hardened. Therefore, purchase costs for the material of the frame 112 are low, making it possible to decrease material costs for producing the actuator.

In the production method of the present invention, the guide rails 114a, 114b alone are heated, without heating the frame 112, for the following reasons.

In the guide-equipped frame 12, comprising the bottom 12a and both sides 12b, 12c which are integrally constructed, it is sufficient only to harden the portions having the first ball-rolling grooves 60a, 60b for enabling the plurality of balls 76 to roll therein, e.g., such that only the guide rails 114a, 114b are hardened by heating, for increasing the surface hardness of such portions.

Figure 5:
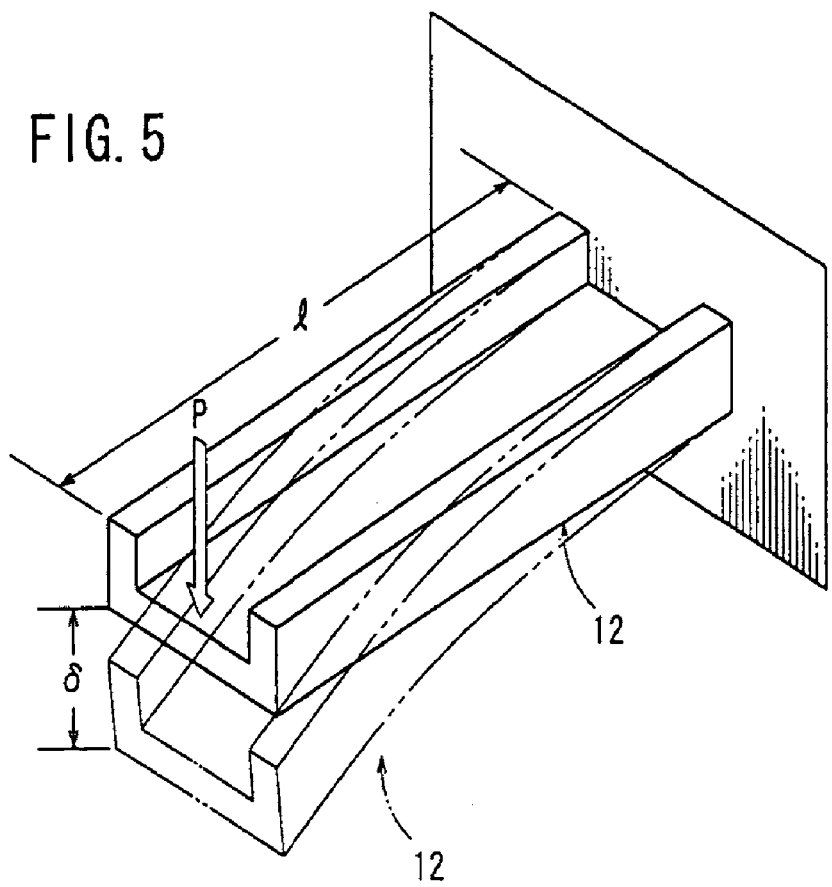
FIG. 5 is a perspective view illustrating the amount of flexion when a load is applied with one end of the guide-equipped frame being fixed.

For example, it is assumed that a load (P) is applied substantially vertically downwardly with respect to the guide-equipped frame 12, with one end of the guide-equipped frame 12 being fixed, as shown in FIG. 5. The load (P) generates flexion ($\delta$) of the guide-equipped frame 12. The amount of flexion ($\delta$) is identical whether the guide-equipped frame 12 comprises a heated and hardened frame, or a non-heated and non-hardened frame.

Specifically, the amount of flexion ($\delta$) is calculated by the following expression (1), in which the Young's modulus (E) is constant. The amount of flexion ($\delta$) generated by the load (P) is identical for the heated frame and the non-heated frame.

$$\delta = Pl^3/3EI \quad (1)$$

wherein P represents the load, l represents the length, E represents the Young's modulus, I represents the second moment of area, and δ represents the amount of flexion.

Figure 6:
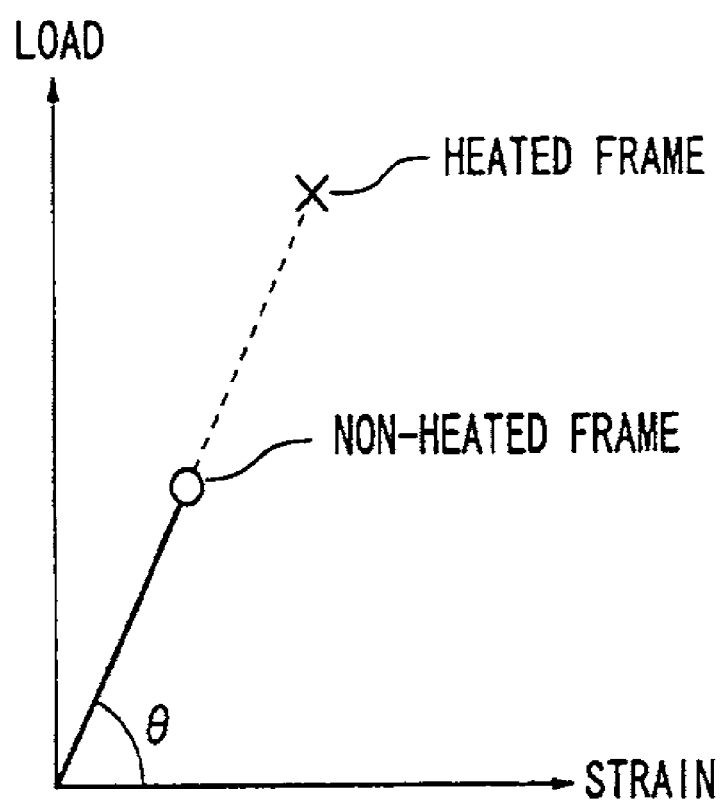
FIG. 6 shows characteristics illustrating the relationship between the load and the strain for a heated frame and a non-heated frame.

The hardened frame extends the elastic limit, and is tough, as shown in FIG. 6. However, the amount of flexion (δ) generated by the same load (P) is identical with respect to the hardened frame and the non-hardened frame. The slope θ is the same as the Young's modulus (E).

In the actuator 10 of the present invention, therefore, the rigidity of the guide-equipped frame 12, which is not heated, can be the same as that of the heated frame.

As discussed above, in the present invention, a flat plate-shaped formable steel member 110, which is pressed to form the frame 112 (see FIGS. 4A and 4B), is composed of a general low cost steel material, whereas each of the prism-shaped guide rails 114a, 114b is formed of a specialized steel material, which is capable of being hardened. The general low cost steel material and the specialized steel material are selected taking into account the following considerations.

The Young's modulus of both the general low cost steel material and the specialized steel material should be substantially the same, and well in excess of that of the light aluminum or light aluminum alloy materials utilized for the base in U.S. Pat. No. 5,775,515. For illustrative purposes, the approximate values and/or ranges of Young's moduli [GPa] for some typical elemental metals, alloys, and steel materials, are listed below.

| Metal | Young's Modulus (GPa) |
| --- | --- |
| Tungsten (W) | 406 |
| Chromium (Cr) | 289 |
| Nickel (Ni) | 214 |
| Iron (Fe) | 196 |
| Low Alloy Steels | 200-207 |
| Stainless Steels | 190-200 |
| Cast Irons | 170-190 |
| Copper (Cu) | 124 |
| Titanium (Ti) | 116 |
| Brasses and Bronzes | 103-124 |
| Aluminum (Al) | 63-75 |

As is immediately apparent from the above listing, aluminum, as well as other light metal aluminum alloys, exhibit a relatively low Young's modulus, roughly only one third that of elemental iron (Fe) and ferrous based steels. Importantly, concerning the steel materials, the Young's modulus thereof remains constant and does not change, whether such steels are subject to a hardening treatment or not.

In particular, it is preferable for the material making up the frame member 112 and the material making up the guide rails 114a, 114b both to possess a Young's modulus which is at or above 170 GPa, and more preferably, at or above 190 GPa.

More specifically, in the aforementioned embodiment, the general low cost steel material may be either one of SS400 and S45C, in accordance with the JIS standard, wherein the steel material is pressed to form the frame 112 (see FIGS. 4A and 4B). In particular, S45C, which is a carbon steel commonly used in fabricating machine structures, has been determined to exhibit a Young's modulus of 199.9 GPa, whereas SS400 is a rolled steel used in fabricating general structures, and possesses a Young's modulus of 206 GPa, wherein both of these steel materials, generally, exhibit a Young's modulus in excess of 170 GPa.

The specialized steel making up the guide rails 114a, 114b and which is subjected to the hardening treatment may be any of SKH9, SCM420 and SUJ2, in accordance with the JIS standard, wherein SKH9 is a high-speed tool steel, SCM420 is a chrome molybdenum steel, and SUJ2 is a high-carbon chromium bearing steel. According to the document, "Standard Mechanical Design Chart Handbook" published by Kyoritsu Shuppan Co., Ltd., the Young's modulus for such specialized steels generally ranges from 199.9 GPa to 210 GPa. In particular, the Young's modulus of SUJ2 is 208 GPa.

Accordingly, the rigidity of the frame 112 is significantly greater than would be possible using a light aluminum alloy. As a result, the frame 112 can be formed from a flat and solid flat plate-shaped formable steel member 110, which is simply pressed to form the frame 112. A large sized frame is not required, and there is no need for internal structural features, such as hollowed cavities or internal ribs, to impart added strength to the frame.

Moreover, since the frame member 112 and the guide rails 114, 114b are both made principally of iron (Fe) based or ferrous materials, the coefficient of linear thermal expansion of the material making up the frame member 112 and the coefficient of linear thermal expansion of the material making up the guide rails 114a, 114b are substantially the same. Preferably, the difference $\Delta C_e$ between the coefficients of linear thermal expansion of the material of the frame member 112 and the material of the guide rails 114a, 114b respectively ($\Delta C_e$=|coefficient of linear thermal expansion of general steel material−coefficient of linear thermal expansion of specialized steel material|) should not exceed $5 \times 10^{-6}/°$ C., more preferably, should not exceed $3 \times 10^{-6}/°$ C., and even more preferably, should not exceed $2 \times 10^{-6}/°$ C. Namely, as one example, the general low cost steel material S45C has a coefficient of linear thermal expansion of $12.1 \times 10^{-6}/°$ C., whereas a typical known specialized steel material, such as the hardenable steel material indicated for the guide rails in U.S. Pat. No. 5,755,515, has a coefficient of linear thermal expansion of $10.7 \times 10^{-6}/°$ C. Thus, in this example, $\Delta C_e = 1.4 \times 10^{-6}/°$ C. As another example, the general low cost steel material SS400 has a coefficient of linear thermal expansion of $12.6 \times 10^{-6}/°$ C., whereas the specialized steel material SUJ2 has a coefficient of linear thermal expansion of $12.5 \times 10^{-6}/°$ C. Thus, in this example, $\Delta C_e = 0.1 \times 10^{-6}/°$ C.

Since the coefficients of linear thermal expansion of the frame member 112 and of the guide rails 114a, 114b are substantially the same, when the actuator is subjected to changes in temperature, the frame member 112 and the guide rails 114a, 114b will expand or contract at the same rate and magnitude, and hence, the secure positioning of the guide rails 114a, 114b within the long grooves 116a, 116b is not adversely affected, and gaps or clearances between the grooves 116a, 116b and the guide rails 114a, 114b do not develop.

First to fourth modified embodiments of the guide-equipped frame 12 produced by the above production method are shown in FIGS. 7 to 10.

Figure 7:
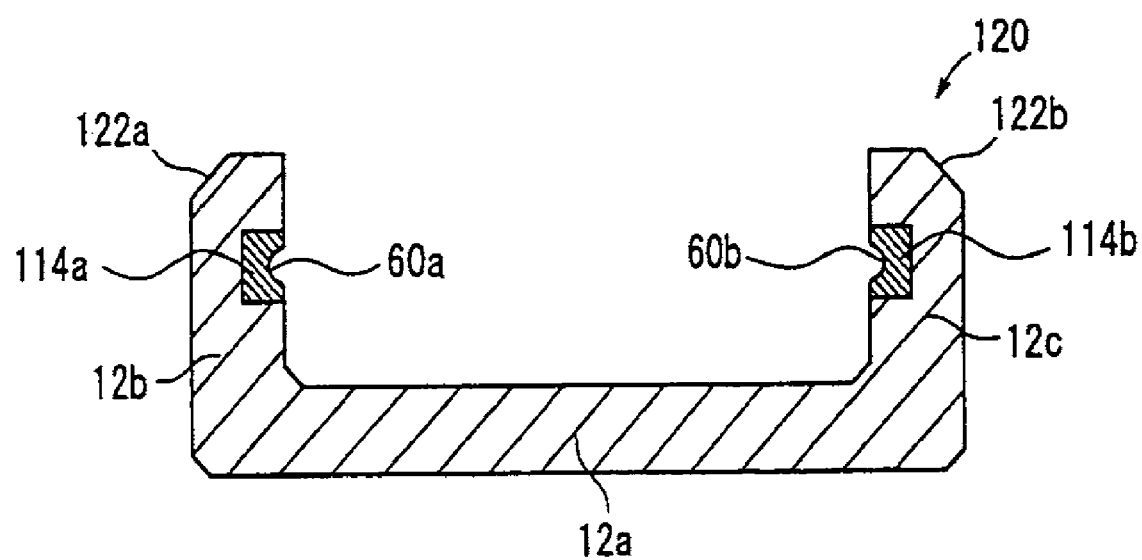
FIG. 7 is a vertical sectional view illustrating a guide-equipped frame according to a first modified embodiment.

As shown in FIG. 7, a guide-equipped frame 120 according to the first modified embodiment has a pair of guide rails 114a, 114b facing one another on the inner wall surfaces of the sides 12b, 12c of the guide-equipped frame 120. Preferably, the upper surfaces of the sides 12b, 12c are partially cut out, and inclined surfaces 122a, 122b inclined by a predetermined angle extend axially.

Figure 8:
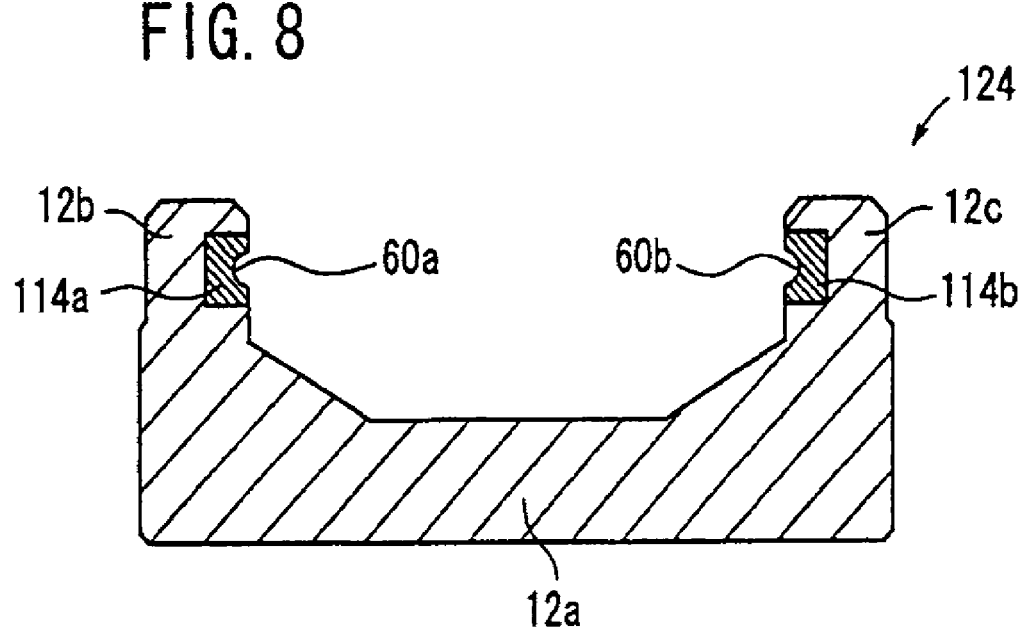
FIG. 8 is a vertical sectional view illustrating a guide-equipped frame according to a second modified embodiment.

As shown in FIG. 8, in a guide-equipped frame 124 according to the second modified embodiment, connecting portions between the bottom 12a and both sides 12b, 12c are thicker than the central portion of the bottom 12a.

Figure 9:
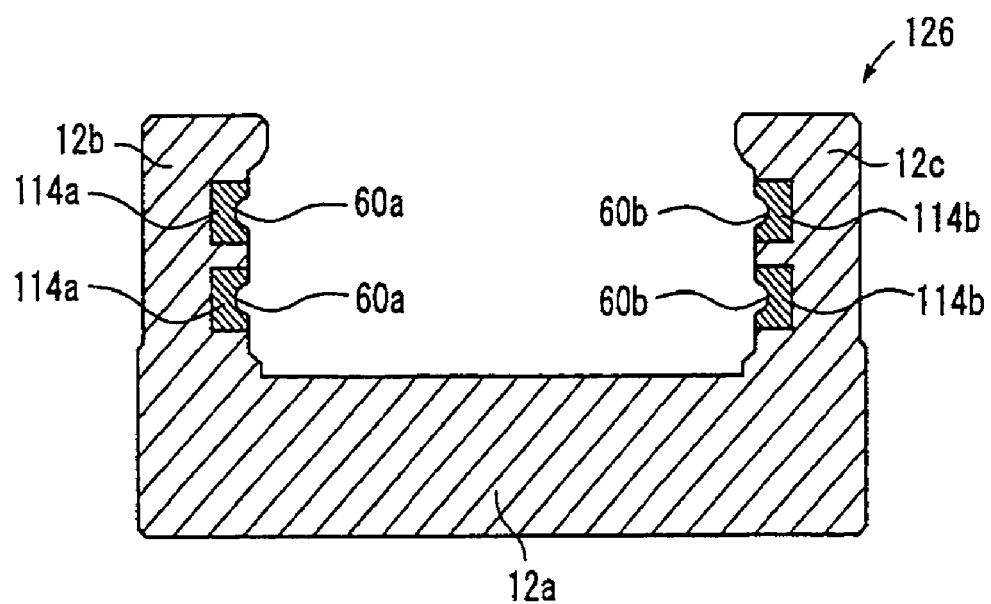
FIG. 9 is a vertical sectional view illustrating a guide-equipped frame according to a third modified embodiment.

As shown in FIG. 9, in a guide-equipped frame 126 according to the third modified embodiment, two strips of guide rails 114a, 114b are disposed along the inner wall surface on both sides 12b and 12c. The two strips forming the guide rails 114a, 114b face the other two strips that form the guide rails 114a, 114b.

Figure 10:
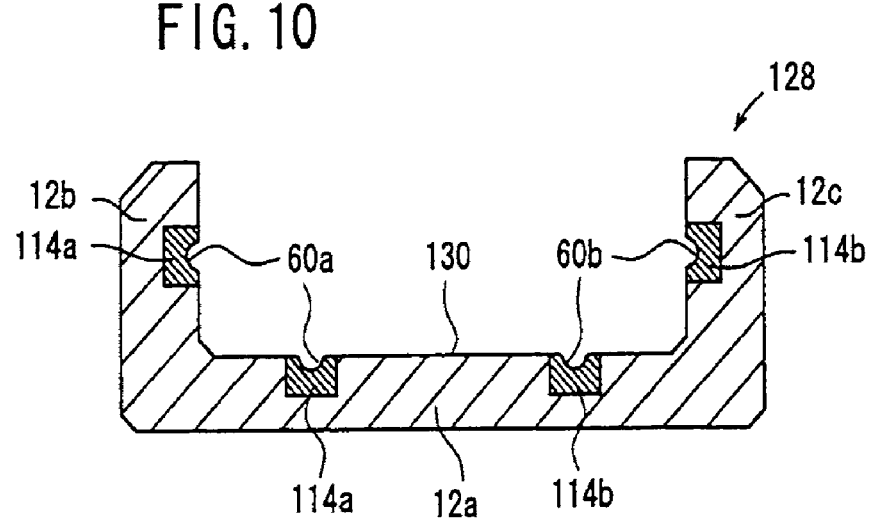
FIG. 10 is a vertical sectional view illustrating a guide-equipped frame according to a fourth modified embodiment.

As shown in FIG. 10, a guide-equipped frame 128 according to the fourth modified embodiment has a pair of mutually opposed guide rails 114a, 114b formed on the inner wall surfaces of both sides 12b, 12c, and a pair of guide rails 114a, 114b substantially in parallel to one another on the bottom surface 130 of the recess of the guide-equipped frame 12.

A method for assembling the actuator 10 shall be explained.

The pairs of plates 68 and covers 70 are installed to both of the end surfaces of the slider 18 by the screws 66. The slider 18 is assembled into the recess of the guide-equipped frame 12 (see FIG. 3). The plates 68, the covers 70 and the return guides 72, which are composed of the same components, are installed on both axial ends of the slider 18. Therefore, the plates 68, the cover 70, and so on, can be installed from any direction to each of the ends of the slider 18 in the actuator 10.

In other words, it is possible to conveniently assemble the same components to one and the other axial ends of the slider 18 without considering the installing direction. Further, the components of the guide mechanism 20 can be standardized to make it possible to reduce the number of components and to decrease production costs.

As shown in FIG. 2, next, the cylindrical section 32 of the ball screw nut 30 is inserted along the opening 78 upwardly from the slider 18. The flanges 36a, 36b are fastened to the side surface of the slider 18 by the screws 34. The feed screw shaft mechanism 16, to which the ball screw shaft 28, the ball screw nut 30, the end plate 50, and the housing 42 are integrally assembled, is installed to the guide-equipped frame 12.

The slider 18 does not form an obstacle, because the opening 78 having a U-shaped cross section is formed at an upper surface of the slider 18. The feed screw shaft mechanism 16, to which the ball screw shaft 28, the ball screw nut 30, the end plate 50, and the housing 42 are integrally assembled, can conveniently be installed in the guide-equipped frame 12, upwardly from the slider 18. Inversely, the feed screw shaft mechanism 16 can be conveniently disengaged from the guide-equipped frame 12 through the opening 78 of the slider 18.

Operations of the actuator 10 shall now be explained.

An unillustrated power source is energized and transmits a rotary driving force from the rotary driving source 14 to the ball screw shaft 28. The rotated ball screw shaft 28 is screwed through the screw hole of the ball screw nut 30. The slider 18 connected to the ball screw nut 30 is integrally displaced in the axial direction of the guide-equipped frame 12 by the guide of the guide mechanism 20. When the polarity of the current flowing through the rotary driving source 14 is inverted by an unillustrated controller, the slider 18 can reciprocate in the axial direction of the guide-equipped frame 12.

While the slider 18 reciprocates in the axial direction of the guide-equipped frame 12, the plurality of balls 76 roll along the first ball-rolling grooves 60a, 60b and the second ball-rolling grooves 62a, 62b.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method for producing an actuator having a guide-equipped frame, comprising the steps of:
pressing a flat plate-shaped formable steel material made of a general steel material to thereby form a frame, wherein said formable steel material from which said frame is formed is not subjected to a heat treatment for hardening said formable steel material;
performing cutting machining on said frame to form long grooves therein, which are subtantially parallel to a longitudinal axis of said frame;
hardening guide rails, which are made of a specialized steel material that is capable of being subjected to a hardening treatment, and thereafter grinding outer surfaces of said guide rails; and
integrally joining said guide rails into said long grooves of said frame an d thereafter forming guide grooves on said guide rails,
wherein said general steel material forming said frame and said specialized steel material forming said guide rails are both metals having a Young's modulus that is equal to or greater than 170 GPa.

2. The method according to claim 1, wherein said general steel material forming said frame and said specialized steel material forming said guide rails are both metals having a Young's modulus that is equal to or greater than 190 GPa.

3. The method according to claim 1, wherein a difference $\Delta C_e$ between a coefficient of linear thermal expansion of said general steel material of said frame member and a coefficient of linear thermal expansion of said specialized steel material of said guide rails respectively ($\Delta C_e$=|coefficient of linear thermal expansion of general steel material−coefficient of linear thermal expansion of specialized steel material|) does not exceed $5 \times 10^{-6}$/° C.

4. The method according to claim 3, wherein the difference between said coefficient of linear thermal expansion of said general steel material of said frame member and said coefficient of linear thermal expansion of said specialized steel material of said guide rails does not exceed $3 \times 10^{-6}$/° C.

5. The method according to claim 4, wherein the difference between sold coefficient of linear thermal expansion of said general steel material of said frame member and said coefficient of linear thermal expansion of said specialized steel material of said guide rails does not exceed $2 \times 10^{-6}$/° C.

6. The method according to claim 1, wherein said guide grooves are ball-rolling grooves enabling a plurality of balls to roll therein.

7. The method according to claim 1, wherein said guide rails have a substantially rectangular prism shaped configuration, having three planar side surfaces fitted in said long grooves.

8. The method according to claim 1, wherein said general steel material is selected from the group consisting of SS400 and S45C, and said specialized steel material is selected from the group consisting of SKH9, SCM420 and SUJ2.

* * * * *